Patented Jan. 19, 1937

2,068,206

UNITED STATES PATENT OFFICE 2,068,206

BISMUTH SALTS OF ARSENO COMPOUNDS AND A PROCESS OF PREPARING THEM

Karl Streitwolf, Frankfort-on-the-Main, Alfred Fehrle, Bad Soden-on-the-Taunus, and Walter Herrmann, Frankfort-on-the-Main, Germany, assignors to Winthrop Chemical Company Inc., New York, N. Y., a corporation of New York No Drawing. Application May 20, 1932, Serial No. 612,632. In Germany June 11, 1931

12 Claims. (Cl. 260—15)

The present invention relates to bismuth salts of arseno compounds and a process of preparing them.

We have found that new and valuable bismuth salts of arseno compounds are obtained by causing an aqueous solution of a bismuth salt to act upon an aqueous solution of a compound of the following formula:

X—As=As—Y.O.CH$_2$.COOZ wherein X and Y stand for aryl or arylimidazole radicals which may be substituted, and Z stands for an alkali metal.

Among the substituents adhering to one or both nuclei of the arseno compound, there may, for instance, be mentioned the groups —OH, —CH$_3$, C$_2$H$_5$, —NH.COCH$_3$, —CH=N.NH.CONH$_2$, —NH.CH$_2$OSO$_2$Na, pyrazole or pyrazolone nuclei, furthermore halogen, such as Cl and Br. One or both of the nuclei of the arseno compound may consist of a condensed aromatic heterocyclic nucleus, such as imidazole. All alkali salts of these compounds are suitable for the process, for instance, the sodium salt, the potassium salt, the lithium salt. Among the bismuth salts used as starting materials, there may be mentioned the salts of strong inorganic acids, for instance, the nitrate and the chloride. The reaction may be carried out at room temperature.

The bismuth salts are yellowish to brownish-yellowish powders which easily dissolve in water and char when heated, without melting. The constitution of the new compounds cannot exactly be ascertained. They may correspond to the following probable formula:

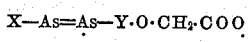

X—As=As—Y.O.CH$_2$.COO
⋮
BiO
⋮ wherein X and Y stand for aryl or arylimidazole radicals which may be substituted, and Z stands for an alkali metal.

The new products are well tolerated and have a good action on spirochaetae diseases. Thus, for instance the bismuth salts prepared according to the examples herein, show, when applied for curing rabbit-syphilis, a chemotherapeutical index that is more favorable than 1:500 and by far exceeds the indices which have been attributed to other arsenobenzenes containing bismuth.

The new compounds are best applied intramuscularly in form of an oily suspension. The compounds serving as starting material and containing the oxyacetic acid group may, for instance, be prepared according to the process described in our co-pending U. S. application Serial No. 504,414, filed December 23, 1930.

The following examples illustrate the invention:

1. 13.3 grams of sodium 3-acetylamino-4-hydroxy-4'-acetylamino - arsenobenzene-6'-oxyacetate are dissolved in 200 cc. of water. To the clear solution are added, drop by drop, while well stirring, 12 grams of bismuth nitrate in 12 cc. of glycerine and 24 cc. of water and the whole solution is then neutralized with 18 cc. of 2N-caustic soda solution. The bismuth compound is precipitated forming a yellow magma, which is entered, while stirring, in 10 parts of alcohol, then filtered from the liquid by suction and washed with alcohol and ether.

The dry substance is a brownish-yellow powder insoluble in water and soluble in alkalies. It may perhaps be composed according to the following formula:

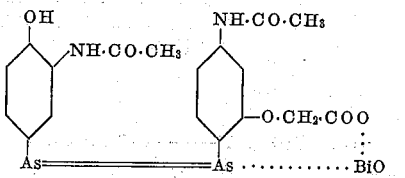

From the alkaline solution the sodium salt can be precipitated by means of alcohol or ether.

2. 13.3 grams of sodium 3-acetylamino-4-hydroxy-5'-acetylaminoarsenobenzene - 4' - oxyacetate are caused to react with a solution of bismuth nitrate in glycerine and worked up as indicated in Example 1. The properties of the compound obtained are the same as those of the compound obtained according to Example 1. It may have the following formula:

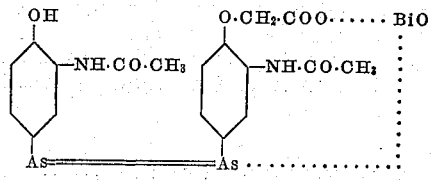

3. 7.8 grams of sodium 2,3-dimethyl-4-acetylamino-1-para-arsenophenylpyrazolone-1'-methyl-5'-arsenobenzimidazole-2'-oxyacetate are dissolved in 100 cc. of water. To this solution is added, drop by drop, while stirring, a solution of 6 grams of bismuth nitrate and 10 grams of mannite in 50 cc. of water. The whole is then neutralized with about 9 cc. of 2N-caustic soda solution. A jellylike precipitate is obtained which is entered, while stirring, in 700 cc. of alcohol, whereafter the solid matter is filtered by suction and washed with alcohol. The bismuth salt of the above mentioned arsenobenzeneoxyacetic acid is thus obtained in the form of a yellow powder insoluble in water. It may have the following constitution:

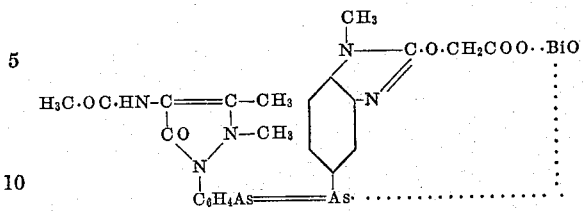

4. 6.8 grams of sodium 5,5'-arsenobenzimidazole-2-hydroxymethyl-1'-methyl-2'-oxyacetate are dissolved in 250 cc. of water. To this solution a solution of 3.94 grams of bismuth trichloride in 50 cc. of a saturated sodium chloride solution is added drop by drop, while stirring. The whole is then neutralized with about 9 cc. of 2N-caustic soda solution. A jellylike precipitate is obtained which is entered, while stirring, in 1.5 liters of methyl alcohol, filtered by suction and dried. After drying the yellow powder is triturated with water, then washed with water until chlorine ions can no longer be detected and again dried. It has the same properties as the bismuth salt described in the preceding example. It may have the following constitution:

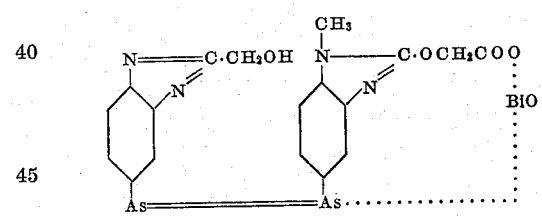

5. 5.6 grams of sodium 2-hydroxy-4-benzaldehyde-semicarbazonearseno-5'-acetylamino-4'-phenoxyacetate are dissolved in 80 cc. of water and caused to react, according to Example 1, with 4.8 grams of bismuth nitrate in a mixture of glycerine and water. The bismuth salt obtained corresponds, as to its properties, to the compounds obtained according to the preceding examples. It may have the following constitution:

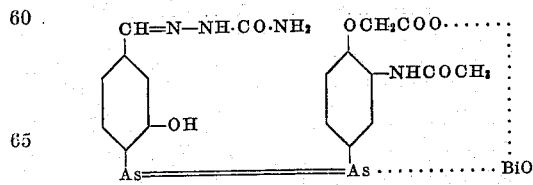

6. 6.8 grams of the sodium salt of (sodium 4-amino-methanesulfonate-2,3-dimethyl-1-para-phenylpyrazolone)-arseno-5'-acetylamino-4'-phenoxyacetate are dissolved in 100 cc. of water and caused to react, according to Example 1, with 4.8 grams of bismuth nitrate in glycerine and water. In this case, too, a yellow, water-insoluble bismuth salt is obtained. It may have the following constitution:

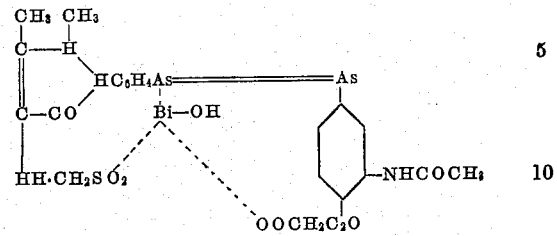

7. 5.5 grams of the sodium salt of (4-dihydroxy-propylamino-2,3-dimethyl-1-para-phenylpyrazolone)-arseno-5'-acetylamino-4'-phenoxyacetic acid are dissolved in 80 cc. of water and caused to react, as indicated in the preceding examples, with 4.8 grams of bismuth nitrate. The yellow bismuth salt obtained has the same properties as the bismuth salts obtained according to the preceding examples. It may have the following constitution:

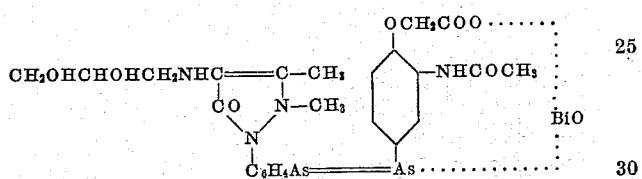

8. 6 grams of the sodium salt of 5,3'-dichloro-4-hydroxy-3,5'-di-acetylamino-arsenobenzene-4'-oxyacetic acid are dissolved in 100 cc. of water and caused to react, as indicated in the preceding examples, with 4.8 grams of bismuth nitrite. The product may perhaps be constituted according to the following formula:

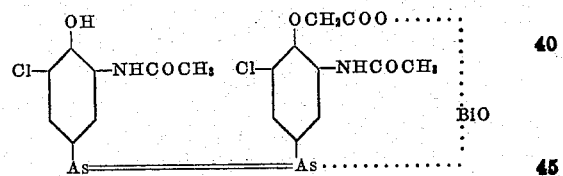

9. 5.4 grams of the sodium salt of sodium 3-amino-methanesulfonate-4-hydroxy-5'-methyl-arsenobenzene-4'-oxyacetate are caused to react, in 80 cc. of water, with 4.8 grams of bismuth nitrate and further treated according to the preceding examples. The product may perhaps be constituted according to the following formula:

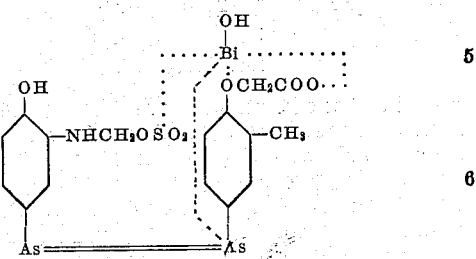

10. 5.3 grams of sodium 3,5'-dihydroxy-arsenobenzene-4,4'-di-(oxyacetate), prepared by saponifying 3,4-dihydroxybenzenediethylcarbamic acid ester-1-arsonic acid in the presence of chloroacetic acid and reducing the 3-hydroxy-1-arsonic acid-4-phenoxyacetic acid thereby obtained to the arsenobenzene compounds, are, as described in the preceding examples, dissolved in water and caused to react with 4.8 grams of bismuth nitrate. The bismuth salt is a yellow powder insoluble in water. The 3,4-dihydroxybenzenediethylcarbamic acid ester-1-arsonic acid used as starting material may be prepared in the following way: 1-nitro-3,4-dihydroxybenzene-carbonate is caused to react with diethylamine and the compound thus obtained is reduced to the 1-amino - 3,4 - dihydroxybenzenediethylcarbamic acid ester. This product is diazotized and caused to react with arsenite. It may have the following constitution:

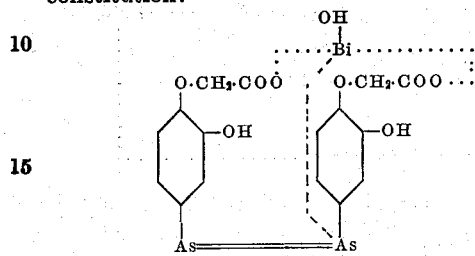

11. 13.3 grams of sodium 4,4'-diacetyldiamino-3-hydroxyarsenobenzene-2'-oxyacetate, prepared by simultaneously reducing 4-acetylamino-3-hydroxybenzene-1-arsonic acid and 4-acetylamino-benzene-1-arsonic acid-2-oxyacetic acid are dissolved in 200 cc. of water and caused to react, as described in the preceding examples, with 12 grams of bismuth nitrate in 12 cc. of glycerine and 24 cc. of water. The reaction liquid is then rendered alkaline to phenol-phthalein by means of caustic soda solution, filtered and neutralized to litmus paper by means of acetic acid. The colloidal magma is entered, while stirring, in 10 times its weight of alcohol, the bismuth compound precipitating in the form of a brownish-yellow powder. The powder is then filtered by suction and washed with alcohol and ether. It has the same properties as the product obtained according to Example 1. The product may perhaps be constituted according to the following formula:

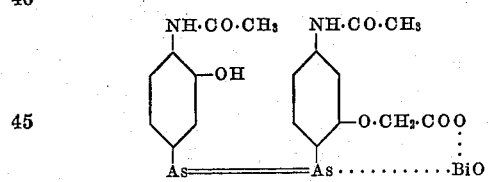

We claim:

1. The process which comprises causing an aqueous solution of a bismuth salt of a strong inorganic acid to act upon an aqueous solution of a compound of the following formula:

X—As=As—Y.O.CH₂.COOZ wherein X and Y are radicals selected from the group consisting of radicals of the benzene and benzene imidazole series and radicals of the benzene and benzene imidazole series substituted by a substituent selected from the group consisting of hydroxyl, chlorine, methyl and acetyl-amino, and Z stands for an alkali metal.

2. The process which comprises causing an aqueous solution of an inorganic bismuth salt of a strong inorganic acid to act upon an aqueous solution of a compound of the following formula:

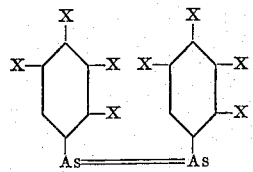

wherein one X stands for —O.CH₂COONa, the other X's stand for a member of the group consisting of hydrogen, hydroxyl, chlorine, methyl and acetyl-amino, at most one substituent of each kind being present in each nucleus.

3. The process which comprises causing an aqueous solution of bismuth nitrate to act upon an aqueous solution of a compound of the following formula:

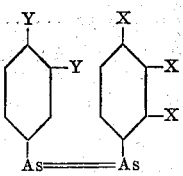

wherein one X stands for —O.CH₂.COONa, one further X for acetylamino and the remaining X for hydrogen, one Y stands for hydroxyl, the other Y for acetyl-amino.

4. The process which comprises causing an aqueous solution of bismuth nitrate to act upon an aqueous solution of a compound of the following formula:

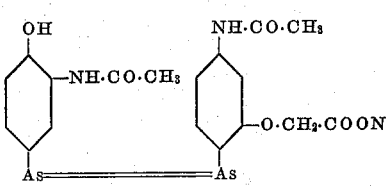

5. The process which comprises causing an aqueous solution of bismuth nitrate to act upon an aqueous solution of a compound of the following formula:

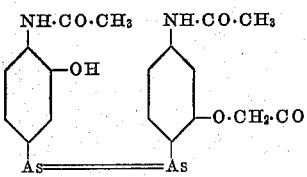

6. The process which comprises causing an aqueous solution of bismuth nitrate to act upon an aqueous solution of a compound of the following formula:

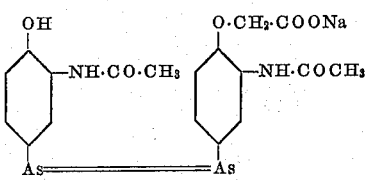

7. Bismuth salts of arsenic compounds, said salts being obtainable by the process according to claim 1 and being of a yellowish to yellowish-brown color, insoluble in water and decomposing without melting.

8. Bismuth salts of arsenic compounds, said salts being obtainable by the process according to claim 2, and being of a yellowish to yellowish-brown color, insoluble in water and decomposing without melting.

9. Bismuth salts of arsenic compounds, said salts being obtainable by the process according to claim 3, and being of a yellowish to yellowish-brown color, insoluble in water and decomposing without melting.

10. Bismuth salt of an arsenic compound, said salt corresponding to the following probable formula:

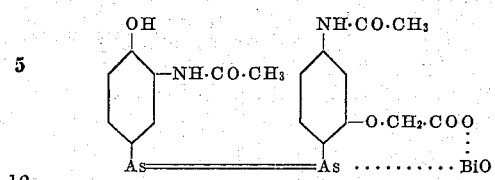

obtainable by the process according to claim 4 and being of a brownish-yellow color, insoluble in water, soluble in alkalies and decomposing without melting.

11. Bismuth salt of an arsenic compound, said salt corresponding to the following probable formula:

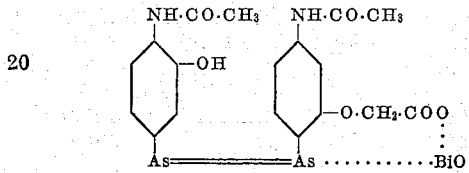

obtainable by the process according to claim 5 and being of a brownish-yellow color, insoluble in water, soluble in alkalies and decomposing without melting.

12. Bismuth salt of an arsenic compound, said salt corresponding to the following probable formula:

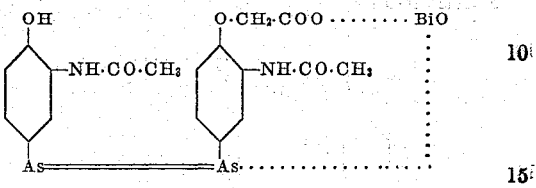

obtainable by the process according to claim 6 and being of a brownish-yellow color, insoluble in water, soluble in alkalies and decomposing without melting.

KARL STREITWOLF.
ALFRED FEHRLE.
WALTER HERRMANN.